(12) United States Patent
Yang et al.

(10) Patent No.: US 10,581,649 B2
(45) Date of Patent: Mar. 3, 2020

(54) APPARATUS FOR SUPPORTING A PLURALITY OF WIRELESS COMMUNICATION SYSTEMS AND OPERATING METHOD OF THE SAME

(71) Applicant: Samsung Electronics Co., Ltd., Suwon-si, Gyeonggi-do (KR)

(72) Inventors: Hayoung Yang, Suwon-si (KR); Chongdon Kim, Suwon-si (KR); Joohyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/282,110

(22) Filed: Feb. 21, 2019

(65) Prior Publication Data

US 2019/0260616 A1 Aug. 22, 2019

(30) Foreign Application Priority Data

Feb. 21, 2018 (KR) .......................... 10-2018-0020741

(51) Int. Cl.
*H04B 1/00* (2006.01)
*H04L 25/03* (2006.01)
(Continued)

(52) U.S. Cl.
CPC ...... *H04L 25/03821* (2013.01); *H04L 25/022* (2013.01); *H04L 25/0224* (2013.01);
(Continued)

(58) Field of Classification Search
CPC .... H04B 1/005; H04B 1/711; H04B 7/15585; H04L 25/03821; H04L 25/022; H04L 25/0224; H04L 25/03
See application file for complete search history.

(56) References Cited

U.S. PATENT DOCUMENTS 9,236,922 B2 1/2016 Park et al.
9,319,197 B2 4/2016 Sahin et al.
(Continued)

FOREIGN PATENT DOCUMENTS

KR 10-2013-0112743 A 10/2013
KR 10-2013-0129973 A 11/2013
(Continued)

*Primary Examiner* — Tuan Pham

(57) ABSTRACT

Provided are an apparatus for supporting a plurality of wireless communication systems and an operating method of the same. The apparatus receives an integrated signal including a first wireless communication system signal and a second wireless communication system signal assigned to a certain frequency band, performs first processing on the integrated signal, performs second processing on the integrated signal, is scheduled to perform at least one of first interference cancellation (IC) process of canceling interference of the first wireless communication system signal from the integrated signal based on the signal on which first processing is performed or second IC process of canceling interference of the second wireless communication system signal from the integrated signal based on the signal on which second processing is performed, and performs at least one of the first IC process or the second IC process based on the scheduling.

20 Claims, 13 Drawing Sheets

(51) Int. Cl.
*H04W 76/15* (2018.01)
*H04L 27/26* (2006.01)
*H04L 25/02* (2006.01)

(52) U.S. Cl.
CPC ...... *H04L 25/03331* (2013.01); *H04L 27/265* (2013.01); *H04L 27/2691* (2013.01); *H04W 76/15* (2018.02)

(56) References Cited

U.S. PATENT DOCUMENTS

| | | | |
|---|---|---|---|
| 9,780,843 B2* | 10/2017 | Mobasher | H04B 7/024 |
| 10,237,781 B2* | 3/2019 | Qian | H04J 11/004 |
| 2015/0098440 A1* | 4/2015 | Yang | H04J 11/0056 |
| | | | 370/330 |

FOREIGN PATENT DOCUMENTS

| | | |
|---|---|---|
| KR | 10-2017-0049960 A | 5/2017 |
| KR | 10-2017-0073138 A | 6/2017 |
| WO | 2016064533 A1 | 4/2016 |
| WO | 2018097696 A1 | 5/2018 |

* cited by examiner

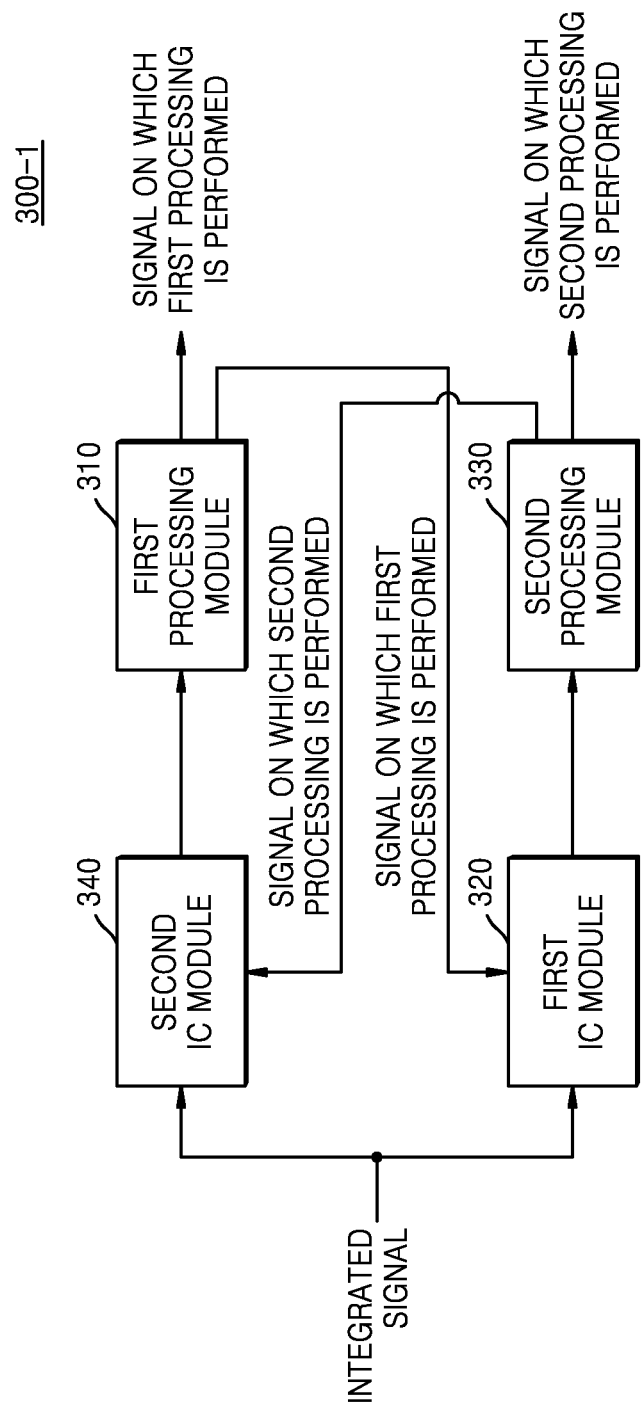

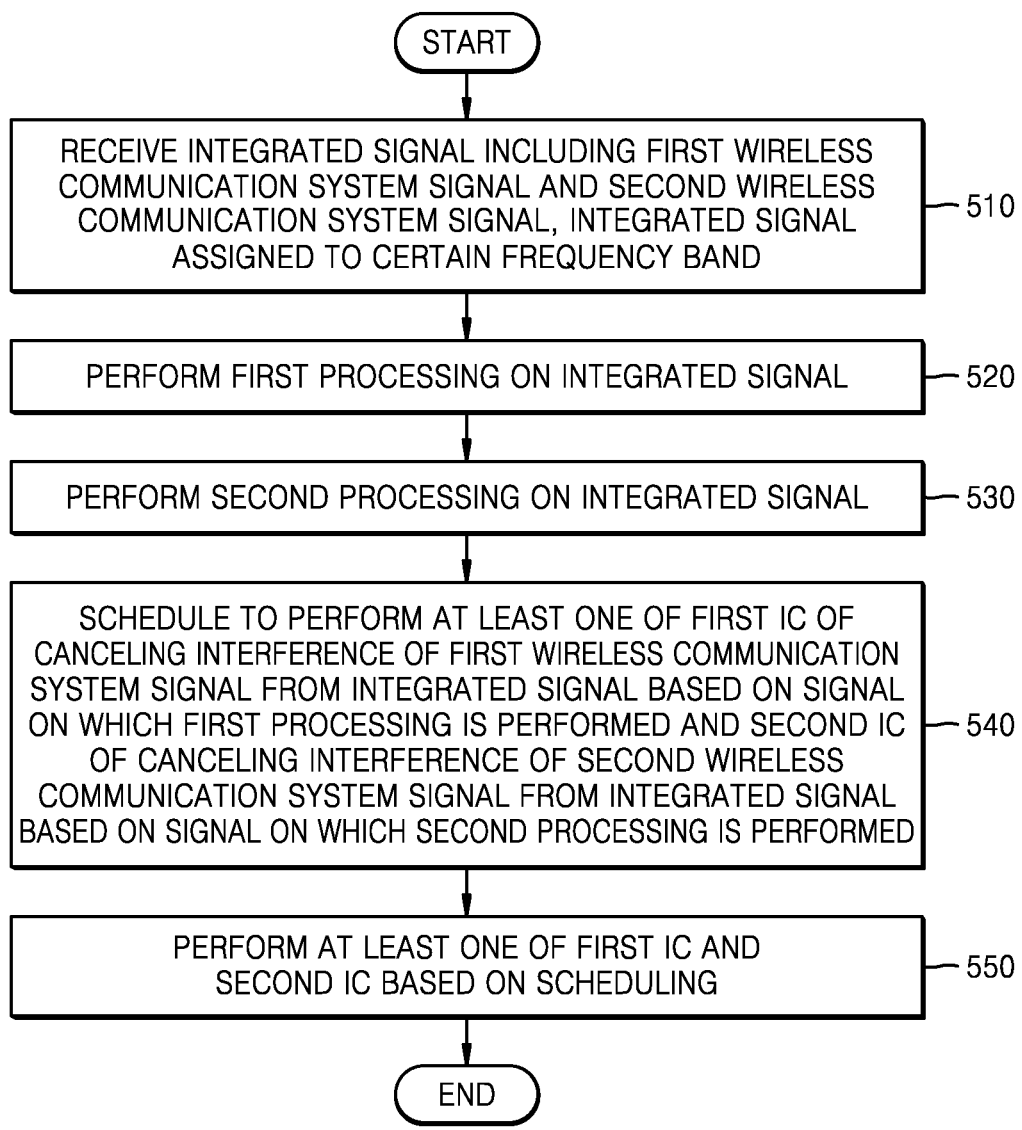

APPARATUS FOR SUPPORTING A PLURALITY OF WIRELESS COMMUNICATION SYSTEMS AND OPERATING METHOD OF THE SAME

CROSS-REFERENCE TO RELATED APPLICATION

This application is based on and claims priority under 35 U.S.C. § 119 to Korean Patent Application No. 10-2018-0020741, filed on Feb. 21, 2018, in the Korean Intellectual Property Office, the disclosure of which is incorporated by reference herein in its entirety.

BACKGROUND

1. Field

The disclosure relates to an apparatus for supporting a plurality of wireless communication systems and an operating method of the apparatus, and more particularly, to an apparatus for providing a plurality of wireless communication systems by applying an interference cancellation technique between the plurality of wireless communication systems, and an operating method of the apparatus.

2. Description of Related Art

Various wireless communication systems including Long Term Evolution (LTE) and Long Term Evolution-Advanced (LTE-A) that have evolved as main wireless communication systems have been developed and serviced. The Internet of Things (IoT) technology has evolved into enhanced Machine Type Communication (eMTC) and Narrow Band-IoT (NB-IoT) technologies that have been standardized by the $3^{rd}$ Generation Partnership Project (3GPP), and the physical layer standard with existing LTE has been arranged and services are provided in various forms. Also, a 5G new radio (NR) system undergoing standardization is realizing a physical channel transmission technology based on an orthogonal frequency division multiplexing (OFDM) technology, with a target of completing Phase 1, i.e., the 3GPP Release 15 standard. Phase 1 technology aims to standardize enhanced Mobile Broadband (eMBB) and Ultra Reliable and Low Latency Communication (URLLC) among three service types considered in the next generation communication, and massive Machine Type Communication (mMTC) will be provided as a next Phase 2 standard.

With the development and expansion of a wireless communication system, the various wireless communication systems described above have been developed and used to accommodate more data services and more users in a limited frequency band. However, when the various wireless communication systems are supported together, throughputs of each wireless communication system may decrease. In this regard, measures for minimizing throughput reductions of each wireless communication system while accommodating more wireless communications within a given frequency are required.

SUMMARY

Provided are an apparatus for supporting a plurality of wireless communication systems by applying an interference cancellation technique between the plurality of wireless communication systems, and an operating method of the apparatus.

Additional aspects will be set forth in part in the description which follows and, in part, will be apparent from the description, or may be learned by practice of the presented embodiments of the disclosure.

According to an embodiment of the disclosure, an apparatus for supporting a plurality of wireless communication systems, the apparatus includes a memory, a transceiver configured to receive an integrated signal including a first wireless communication system signal and a second wireless communication system signal assigned to a certain frequency band, and at least one processor configured to perform a first process on the integrated signal, perform a second process on the integrated signal, schedule the apparatus to perform at least one of first interference cancellation (IC) process of canceling interference of the first wireless communication system signal from the integrated signal based on the signal on which first processing is performed or second IC process of canceling interference of the second wireless communication system signal from the integrated signal based on the signal on which second processing is performed, and perform at least one of the first IC process or the second IC process based on the schedule.

According to another embodiment of the disclosure, an operating method of an apparatus for supporting a plurality of wireless communication systems, the operating method includes receiving an integrated signal including a first wireless communication system signal and a second wireless communication system signal assigned to a certain frequency band, performing a first process on the integrated signal; performing second processing on the integrated signal, schedule the apparatus to perform at least one of first interference cancellation (IC) process of canceling interference of the first wireless communication system signal from the integrated signal based on the signal on which first processing is performed or second IC process of canceling interference of the second wireless communication system signal from the integrated signal based on the signal on which second processing is performed; and performing at least one of the first IC or the second IC based on the scheduling.

According to another embodiment of the disclosure, a non-transitory computer-readable recording medium has recorded thereon a program which, when executed by a computer, cause a processor to receive an integrated signal including a first wireless communication system signal and a second wireless communication system signal assigned to a certain frequency band, perform a first process on the integrated signal; performing second processing on the integrated signal schedule the apparatus to perform at least one of first interference cancellation (IC) process of canceling interference of the first wireless communication system signal from the integrated signal based on the signal on which first processing is performed or second IC process of canceling interference of the second wireless communication system signal from the integrated signal based on the signal on which second processing is performed, and perform at least one of the first IC process or the second IC process based on the scheduling.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will he more apparent from the following description taken in conjunction with the accompanying drawings, in which:

FIG. 3A is an exemplary block diagram showing signal processing processes for processing a plurality of wireless communication system signals in a time domain according to one embodiment of the disclosure;

FIG. 5 is another exemplary flowchart of signal processing processes for supporting plurality of wireless communication system signals according to one embodiment of the disclosure;

DETAILED DESCRIPTION

Figure 1:
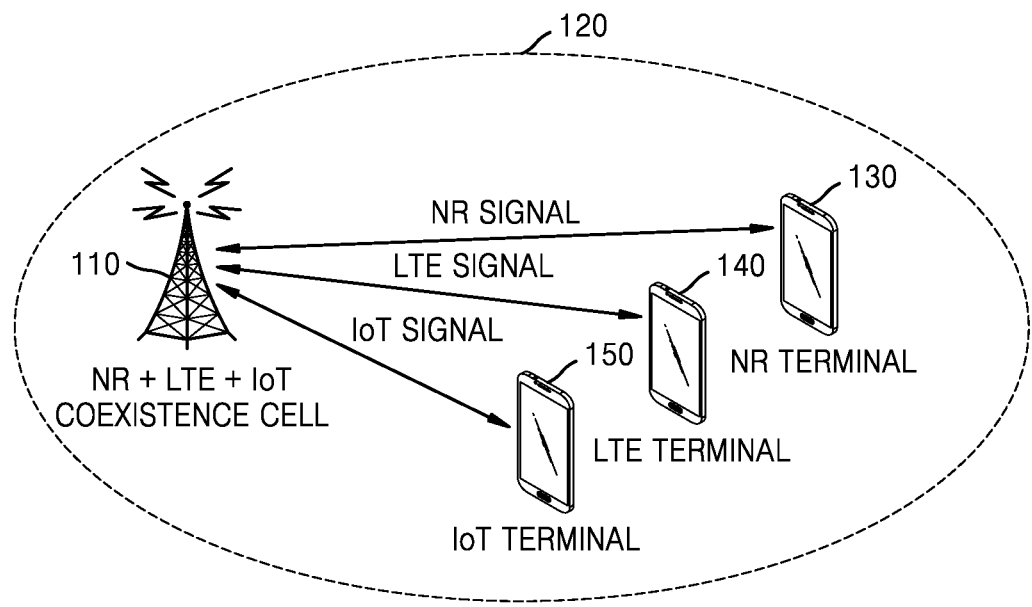
FIG. 1 is an overview diagram of providing a plurality of wireless communication to various devices.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

One or more embodiments of the disclosure will now be described more fully with reference to the accompanying drawings. However, the one or more embodiments of the disclosure may be embodied in many different forms, and should not be construed as being limited to the embodiments of the disclosure set forth herein; rather, these embodiments of the disclosure are provided so that this disclosure will be thorough and complete, and will fully convey the concept of the one or more embodiments of the disclosure to those of ordinary skill in the art. In the following description, well-known functions or constructions are not described in detail because they would obscure the one or more embodiments of the disclosure with unnecessary detail, and like reference numerals in the drawings denote like or similar elements throughout the specification.

Terms used herein may be used to describe various components, but the components should not be limited by those terms. The terms are only used to distinguish one component from another component.

Enclosed drawings may be schematically illustrated to describe one or more embodiments of the disclosure, and some dimensions may be exaggerated for clarity. Similarly, a substantial portion of the drawing may be arbitrarily represented.

The term "unit" or "module" used in the disclosure should be construed as including software, hardware, or a combination thereof, depending on the context in which the term is used. For example, software may be a machine language, firmware, an embedded code, and application software. As another example, hardware may be a circuit, a processor, a computer, an integrated circuit, an integrated circuit core, a sensor, a micro-electro-mechanical system (MEMS), a passive device, or a combination thereof.

In the disclosure, an uplink refers to a radio link in which a terminal (a user equipment (UE), a mobile station (MS), or a terminal) transmits data or a control signal to a base station (an eNode B or a base station (BS)), and a downlink refers to a radio link in which a BS transmits data or a control signal to a terminal.

One or more embodiments of the disclosure and the accompanying drawings of the disclosure are described for explaining the disclosure, but the disclosure is not limited to the one or more embodiments of the disclosure or the accompanying drawings.

Hereinafter, the disclosure will be described with reference to the accompanying drawings.

FIG. 1 is an overview diagram of an apparatus 100 for providing a plurality of wireless communication systems.

In the present specification, an "apparatus" is a subject that performs resource assignment of a terminal, and may be at least one of a BS, a gNode B, an eNode B, a node B, a wireless access unit, a BS controller, or a node on a network. However, the apparatus is not limited thereto.

Also, in the present specification, a "terminal" may include a UE, an MS, a cellular phone, a smart phone, a computer, or a multimedia system capable of performing a communication function. However, the terminal is not limited thereto.

Also, in the present specification, a "resource" may denote a frequency resource, a time resource, or a space resource. However, the resource is not limited thereto.

The apparatus 110 according to an embodiment of the disclosure may provide a plurality of wireless communication systems. For example, as shown in FIG. 1, the apparatus 110 may provide a coexistence cell 120 providing Long Term Evolution (LTE), New Radio (NR), and Internet of Things (IoT) services of a wireless communication system. The apparatus 110 transmits and receives an NR signal to and from an NR terminal 130, an LTE signal to and from an LTE terminal 140, and an IoT signal to and from an IoT terminal 150.

According to an embodiment of the disclosure, the apparatus 110 may assign resources in an orthogonal manner so as to reduce effects by interference among resources of signals transmitted and received in the plurality of wireless communication systems. However, when the resources are assigned in the orthogonal manner, throughput of each wireless communication system may be reduced according to a resource assignment ratio between the plurality of different wireless communication systems. When the plurality of wireless communication systems are supported in a certain frequency band, the resources need to be distributed in proportion to the number of supported wireless communication systems, and additional capacity reduction is inevitable due to using Time Division Multiplexing (TDM) or Frequency Division Multiplexing (FDM). In addition, throughput may be reduced according to an operation of a scheduler for managing the plurality of wireless communication systems.

In order to prevent throughput reduction of each wireless communication system, the apparatus 110 according to an embodiment of the disclosure may perform interference cancellation (IC) between the different wireless communication systems. When IC is performed between the different wireless communication systems, effects on signals transmitted and received in the plurality of wireless communication systems by interference among resources may be reduced not only when the apparatus 110 uses an orthogonal assigning method on the resources but also when the apparatus 110 uses a non-orthogonal assigning method. The apparatus 110 may more efficiently use frequency resources and time resources by using the non-orthogonal assigning method than by using the orthogonal assigning method.

Figure 2:
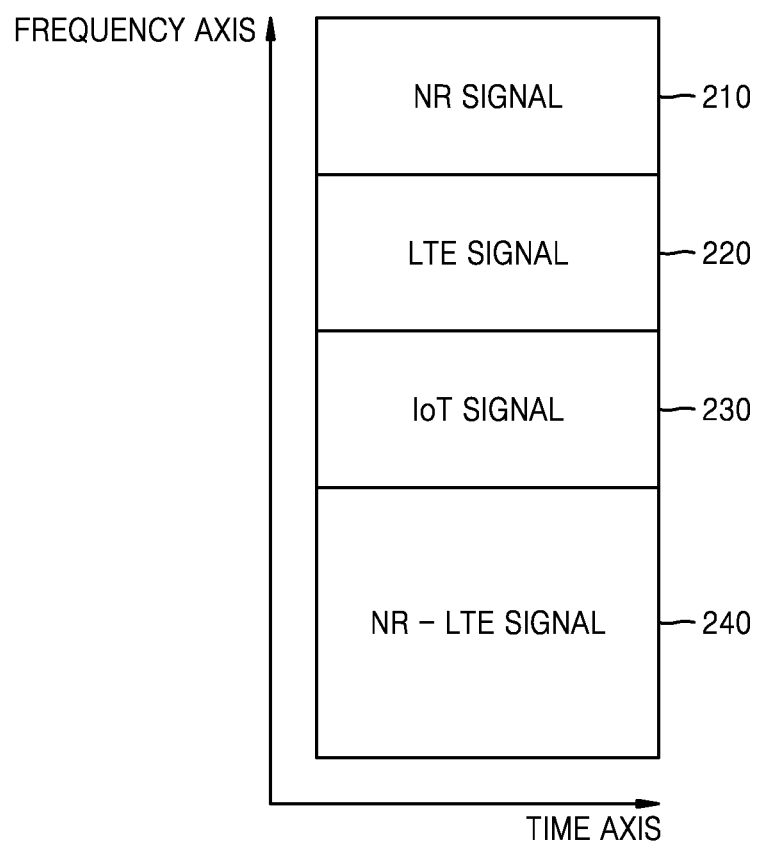
FIG. 2 is an exemplary diagram for describing an apparatus receiving a plurality of wireless communication system signals in a certain frequency band according to one embodiment of the disclosure.

FIG. 2 is an exemplary diagram describing receiving a plurality of wireless communication system signals in a certain frequency band according to one embodiment of the present disclosure.

The apparatus according to an embodiment of the disclosure may receive the plurality of wireless communication system signals in the certain frequency band. For example, as shown in FIG. 2, a BS may receive an NR signal 210, an LTE signal 220, an IoT signal 230, and an NR-LTE signal 240 in the certain frequency band. In the NR-LTE signal 240, an NR signal and an LTE signal are overlapped and assigned.

The certain frequency band in which the apparatus receives the plurality of wireless communication system signals may be determined based on a wireless communication system on which the apparatus is based. For example, when the apparatus is based on LTE, the apparatus may receive the plurality of wireless communication system signals in a 20 MHz band.

Referring to FIG. 2, the orthogonal assigning method is used with respect to the NR signal 210, the LTE signal 220, and the IoT signal 230, and the non-orthogonal assigning method is used with respect to the NR-LTE signal 240.

As described with reference to FIG. 1, throughputs of each wireless communication system may be reduced when the apparatus supports a plurality of wireless communication systems. In order to increase efficiency of resources, the apparatus may consider a method of performing a IC process while supporting plurality of wireless communication systems. When the non-orthogonal assigning method is used while performing the IC process, the apparatus may efficiently support more wireless communication systems while preventing throughput reduction in a limited frequency band.

Figure 3B:
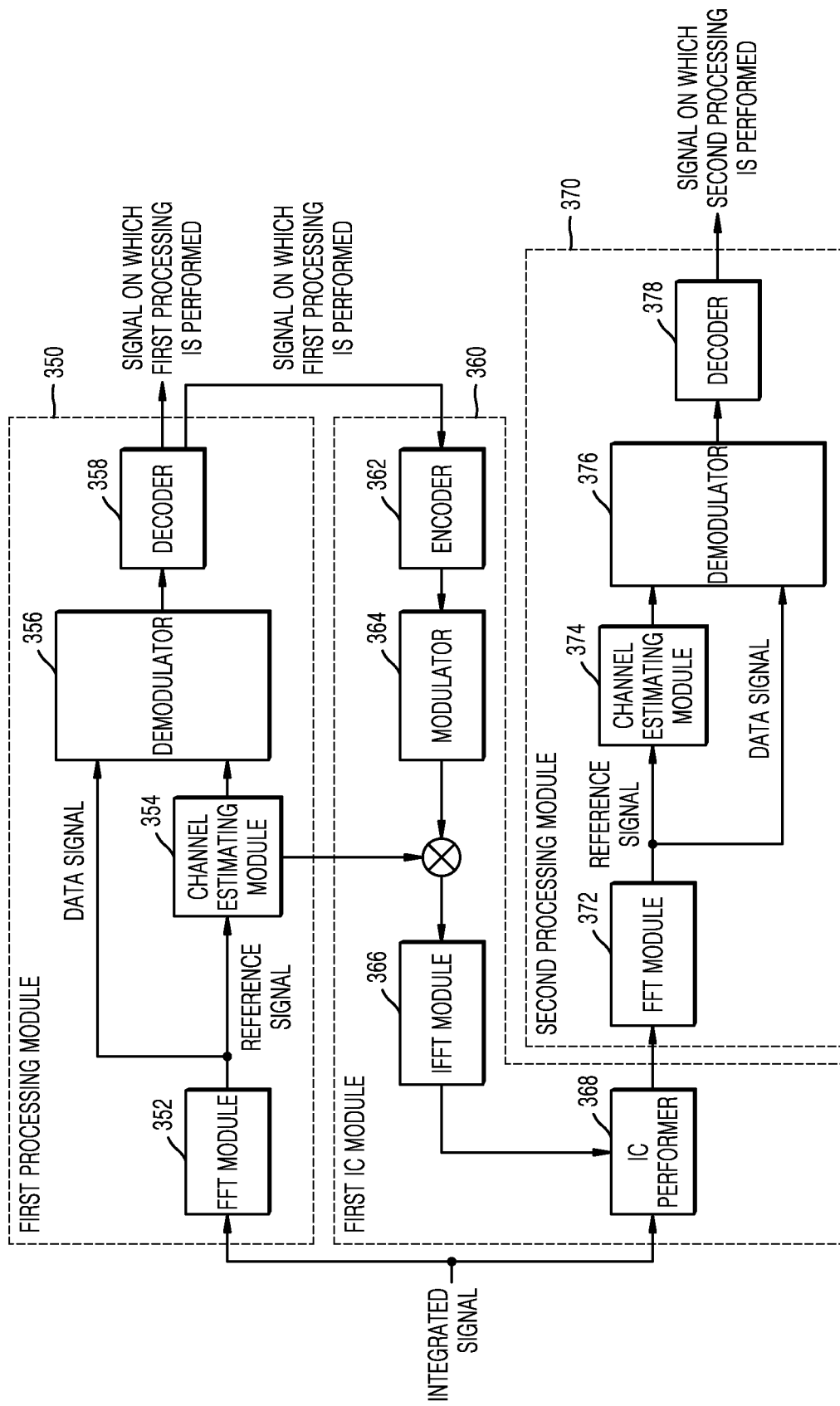
FIG. 3B is an exemplary block diagram showing signal processing processes for processing a plurality of wireless communication system signals in a time domain according to one embodiment of the disclosure.

FIGS. 3A and 3B are block diagrams showing processes of apparatuses 300-1 and 300-2 processing a plurality of wireless communication system signals in a time domain according to embodiments of the disclosure.

In the present specification, an integrated signal denotes a signal collectively referring to a plurality of wireless communication system signals assigned to a certain frequency band, but a range of the integrated signal is not limited thereto. For example, a signal obtained by performing at least one of down-sampling, Fast Fourier Transformation (FFT), or resource de-mapping on the plurality of wireless communication system signals assigned to the certain frequency band may also be referred to as the integrated signal.

Also, in the present specification, "IC" may denote an operation of canceling interference of a certain wireless communication system signal by removing, by subtraction, interference of the certain wireless communication system signal from an integrated signal.

Components shown in FIGS. 3A and 3B are not all essential components of the apparatuses 300-1 and 300-2, and the apparatuses 300-1 and 300-2 may include more or less components than those shown in FIGS. 3A and 3B.

FIG. 3A is a block diagram showing signal processing processes of the apparatus 300-1 for performing a bi-directional IC process based on a plurality of wireless communication system signals in a time domain, according to one embodiment of the present disclosure.

The apparatus 300-1 according to an embodiment of the disclosure may include a first processing module 310, a first IC module 320, a second processing module 330, and a second IC module 340.

The first processing module 310 may perform a first process on an integrated signal. For example, the first processing module 310 may perform the first process on the integrated signal that is not affected by the second IC module 340. Alternatively, the first processing module 310 may perform the first process on the integrated signal from which interference of a second wireless communication system signal is canceled via the second IC module 340.

The first process may include an operation of performing FFT on a signal transmitted to the first processing module 310, an operation of demodulating the signal on which FFT is performed, and an operation of decoding the demodulated signal, but the first processing may additionally include other operations or skip some of these listed operations.

The first IC module 320 may perform first IC process of canceling interference of a first wireless communication system signal from the integrated signal, based on the signal on which the first process is performed by the first processing module 310.

The first IC process may include an operation of encoding the signal demodulated by the first processing module 310, an operation of modulating the encoded signal, an operation of performing inverse FFT (IFFT) on the modulated signal, and an operation of canceling interference of the first wireless communication system signal from the integrated signal based on the signal on which IFFT is performed, but the first IC may additionally include other operations or skip some of these listed operations.

The second processing module 330 may perform second processing on the signal on which the first IC process is performed by the first IC module 320. The second processing may include an operation of performing FFT on a signal transmitted to the second processing module 330, an operation of demodulating the signal on which FFT is performed, and an operation of decoding the demodulated signal, but the second processing may additionally include other operations or skip some of these listed operations.

The second IC module 340 may perform second IC of canceling interference of the second wireless communication system signal from the integrated signal, based on the signal on which the second processing is performed by the second processing module 330.

The second IC may include an operation of encoding the signal decoded by the second processing module 330, an operation of modulating the encoded signal, and an operation of canceling interference of the second wireless communication system signal from the integrated signal, but the second IC may additionally include other operations or skip some of these listed operations.

FIG. 3B is a block diagram showing a signal processing process of the apparatus 300-2 for performing a uni-directional IC process based on a plurality of wireless communication system signals in a time domain according to an embodiment of the disclosure.

The apparatus 300-2 may include a first processing module 350, a first IC module 360, and second processing module 370. The first processing module 310, the first IC module 320, and the second processing module 330 of FIG. 3A may operate in the same or similar manner as the first processing module 350, the first IC module 360, and the second processing module 370 of FIG. 3B.

The first processing module 350 may include an FFT module 352, a channel estimating module 354, a demodulator 356, and a decoder 358.

Because sampling rates of a plurality of wireless communication system signals included in an integrated signal are different, the FFT module 352 may perform a down-sampling to adjust the sampling rates and perform FFT on a signal on which down-sampling is performed. Also, a resource de-mapping may be performed on the signal on which FFT is performed.

The channel estimating module 354 may obtain a reference signal among signals processed by the FFT module 352, and obtain information about channel shift, based on the reference signal.

The reference signal may include a pilot signal. The channel estimating module 354 may obtain the pilot signal among the signals processed by the FFT module 352, and predict a channel shift state of the processed signals based on the obtained pilot signal.

The demodulator 356 may equalize a data signal among the signals processed by the FFT module 352, based on the information about channel shift received from the channel estimating module 354, and demodulate the equalized signal. The demodulator 356 may transmit the demodulated signal to the decoder 358.

The decoder 358 may decode the signal obtained from the demodulator 356. The signal decoded by the decoder 358 may be referred to as the signal on which first processing is performed.

The first IC module 360 may include an encoder 362, a modulator 364, an IFFT module 366, and an IC performer 368.

The encoder 362 may encode the signal on which the first processing is performed. For example, the encoder 362 may encode the signal on which the first processing is performed and obtained from the decoder 358 included in the first processing module 350.

The modulator 364 may modulate the signal obtained from the encoder 362.

The first IC module 360 may additionally include a multiplexer (MUX) in addition to the encoder 362, the modulator 364, the IFFT module 366, and the IC performer 368. The MUX according to an embodiment of the disclosure may multiplex the signal obtained from the modulator 364 and channel estimation information obtained from the channel estimating module 354 and transmit a resultant signal to the IFFT module 366. The signal multiplexed by the MUX may include information about a channel of a signal before being demodulated by the demodulator 356.

The IFFT module 366 may perform a resource mapping on the signal obtained from the MUX, perform IFFT on the signal on which resource mapping is performed, and perform an up-sampling on the signal on which IFFT is performed. The signal on which IFFT is performed by the IFFT module 366 may operate in a time domain.

The IC performer 368 may cancel interference of the first wireless communication system signal from the integrated signal, based on the signal obtained from the IFFT module 366.

The second processing module 370 may include an FFT module 372, a channel estimating module 374, a demodulator 376, and a decoder 378.

The FFT module 372 may perform down-sampling on the signal on which first IC is performed according to a sampling rate corresponding to a second wireless communication system, perform FFT on the signal on which down-sampling is performed, and perform resource de-mapping on the signal on which FFT is performed. In other words, the FFT module 372 may perform down-sampling on the signal obtained from the IC performer 368, perform FFT on the signal on which down-sampling is performed, and perform resource de-mapping on the signal on which FFT is performed.

Meanwhile, different sampling rates are applied to the FFT module 372 because subcarrier spacing varies in the FFT module 352. Accordingly, the FFT module 372 of the second processing module 370 may perform down-sampling different from down-sampling performed by the FFT module 352 of the first processing module 310.

The channel estimating module 374 may obtain a reference signal among the signals processed by the FFT module 372, and obtain information about channel shift of the signals processed by the FFT module 372, based on the reference signal.

The demodulator 376 may equalize a data signal among the signals processed by the FFT module 372, based on the information about channel shift received from the channel estimating module 374, and demodulate the equalized signal. The demodulator 376 may transmit the demodulated signal to the decoder 378.

The decoder 378 may decode the signal obtained from the demodulator 376. The signal decoded by the decoder 358 may be referred to as the signal on which second processing is performed.

Figure 4A:
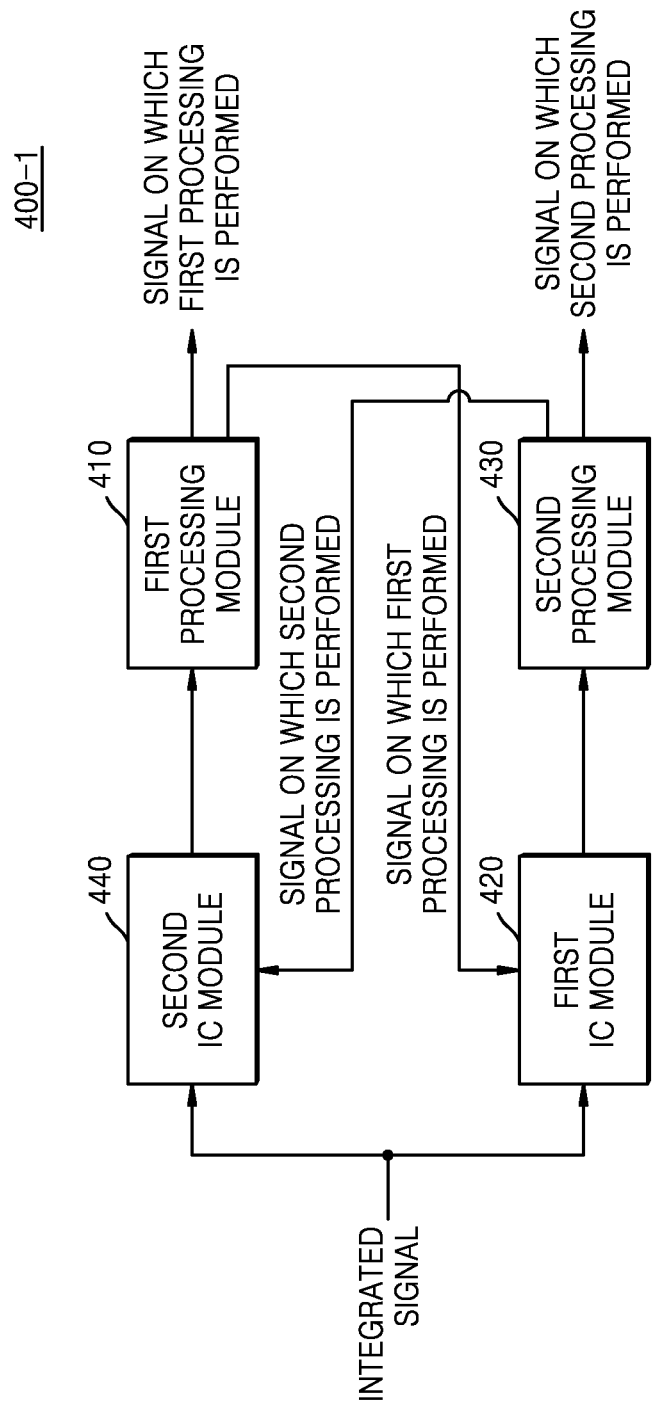
FIG. 4A is an exemplary block diagram showing signal processing processes for processing a plurality of wireless communication system signals in a frequency domain according to one embodiment of the disclosure.
Figure 4B:
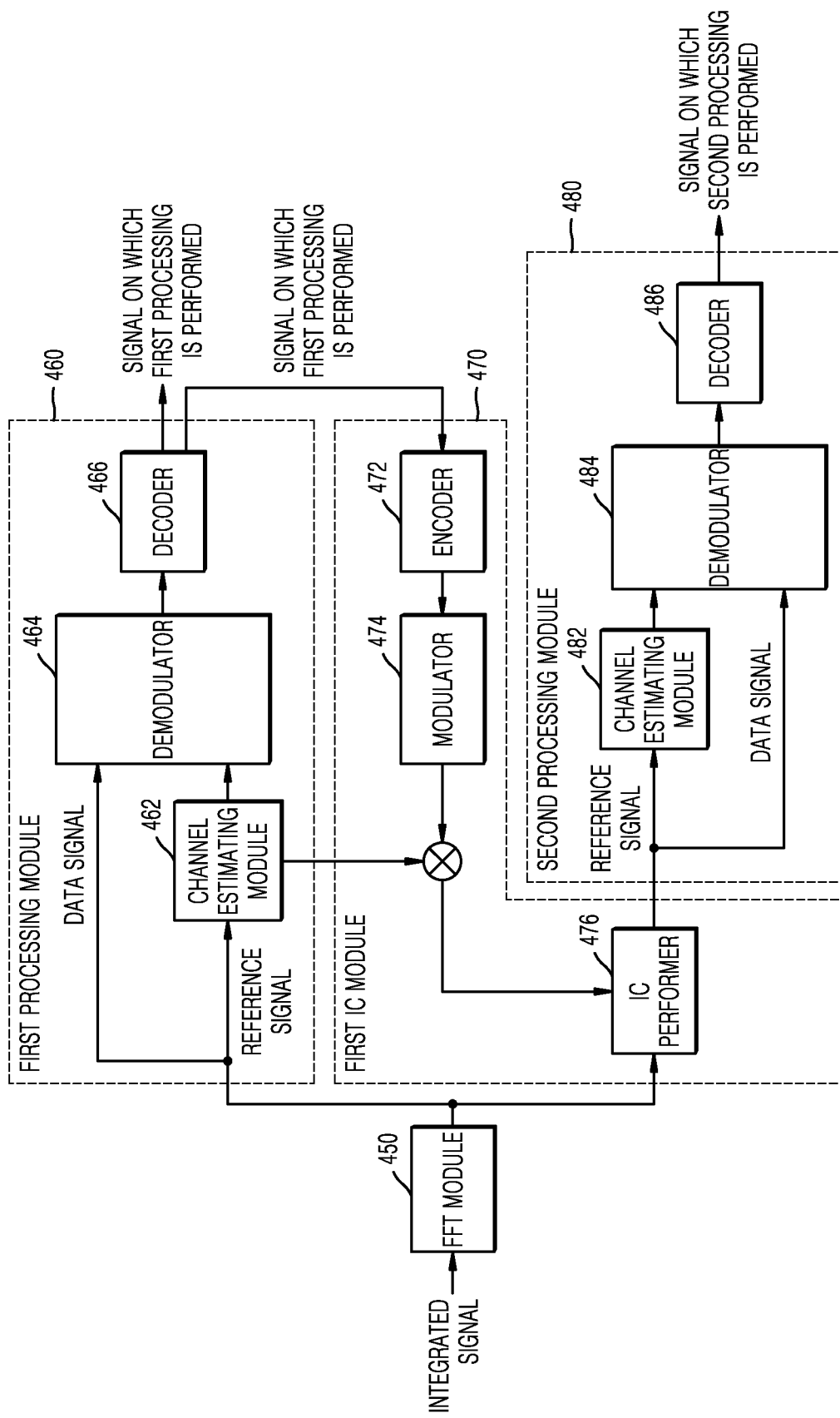
FIG. 4B is an exemplary block diagram showing signal processing processes for processing a plurality of wireless communication system signals in a frequency domain according to one embodiment of the disclosure.

FIGS. 4A and 4B are block diagrams showing signal processing processes of apparatuses 400-1 and 400-2 for processing a plurality of wireless communication system signals in a frequency domain, according to embodiments of the disclosure.

Components shown in FIGS. 4A and 4B are not all essential components of the apparatuses 400-1 and 400-2, and the apparatuses 400-1 and 400-2 may include more or less components than those shown in FIGS. 4A and 4B.

FIG. 4A is a block diagram showing processes of the apparatus 400-1 according to an embodiment of the disclosure performing bi-directional IC based on a plurality of wireless communication system signals in a frequency domain.

Here, the details overlapping the descriptions of FIG. 3 will be briefly described.

The apparatus 400-1 according to an embodiment of the disclosure may include a first processing module 410, a first IC module 420, a second processing module 430, and a second IC module 440.

Although not illustrated in FIG. 4A an integrated signal may be transmitted to the first IC module 420 and the second IC module 440 after at least one operation among down-sampling, FFT, and the resource de-mapping is performed.

The first processing module 410 may perform a first processing on the integrated signal. For example, the first processing module 410 may perform the first processing on the integrated signal on which at least one operation among down-sampling, FFT, and resource de-mapping is performed. Alternatively, the first processing module 410 may perform first processing on a signal from which interference of a second wireless communication system signal is canceled via the second IC module 440.

The first processing may include an operation of demodulating the signal transmitted to the first processing module 410 and an operation of decoding the demodulated signal, but the first processing may additionally include other operations or skip some of these listed operations.

According to an embodiment of the disclosure, the first IC module 420 may perform the first IC process of canceling interference of a first wireless communication system signal from the integrated signal, based on the signal on which first processing is performed by the first processing module 410. Alternatively, the first IC module 420 may perform first IC of canceling interference of the first wireless communication system signal from the integrated signal on which at least one operation among down-sampling, FFT, and resource de-mapping is performed, based on the signal on which first processing is performed by the first processing module 410.

The first IC may include an operation of encoding the signal demodulated by the first processing module 410, an operation of modulating the encoded signal, an operation of performing IFFT on the modulated signal, and an operation of canceling interference of the first wireless communication system signal from the integrated signal (or the integrated signal on which at least one operation among down-sampling, FFT, and resource de-mapping is performed), based on the signal on which IFFT is performed, but the first IC process may additionally include other operations or skip some of these listed operations.

The second processing module 430 may perform second processing on the signal on which the first IC process is performed by the first IC module 420. The second processing may include an operation of performing FFT on a signal transmitted to the second processing module 430, an operation of demodulating the signal on which FFT is performed, and an operation of decoding the demodulated signal, but the second processing may additionally include other operations or skip some of these listed operations.

The second IC module 440 may perform second IC of canceling interference of the second wireless communication system signal from the integrated signal (or the integrated signal on which at least one operation among down-sampling, FFT, and resource de-mapping is performed), based on the signal on which the second processing is performed by the second processing module 430.

The second IC may include an operation of encoding the signal decoded by the second processing module 430, an operation of modulating the encoded signal, an operation of performing IFFT on the modulated signal, and an operation of canceling interference of the second wireless communication system signal from the integrated signal (or the integrated signal on which at least one operation among down-sampling, FFT, and resource de-mapping is performed) based on the signal on which IFFT is performed, but the second IC process may additionally include other operations or skip some of these listed operations.

FIG. 4B is a block diagram showing signal processing processes of the apparatus 400-2 for performing a uni-directional IC process based on a plurality of wireless communication system signals in a frequency domain according to an embodiment of the disclosure.

The apparatus 400-2 may include an FFT module 450, a first processing module 460, a first IC module 470, and second processing module 480. The first processing module 410, the first IC module 420, and the second processing module 430 of FIG. 4A may operate in the same or similar manner as the first processing module 460, the first IC module 470, and the second processing module 480 of FIG. 4B.

Because sampling rates of a plurality of wireless communication system signals included in an integrated signal are different, the FFT module 450 may perform down-sampling to adjust the sampling rates and perform FFT on a signal on which down-sampling is performed. Also, resource de-mapping may be performed on the signal on which FFT is performed.

The first processing module 460 may include a channel estimating module 462, a demodulator 464, and a decoder 466.

The channel estimating module 462 may obtain a reference signal among signals processed by the FFT module 450, and obtain information about channel shift of the processed signals, based on the reference signal.

The demodulator 464 may equalize a data signal among the signals processed by the FFT module 450, based on the information about channel shift received from the channel estimating module 462, and demodulate the equalized signal. The demodulator 464 may transmit the demodulated signal to the decoder 466.

The decoder 466 may decode the signal obtained from the demodulator 464. The signal decoded by the decoder 466 may be referred to as the signal on which the first process is performed.

The first IC module 470 according to an embodiment of the disclosure may include an encoder 472, a modulator 474, and an IC performer 476.

The encoder 472 may encode the signal on which first processing is performed. For example, the encoder 472 may encode the signal on which first processing is performed and obtained from the decoder 466 included in the first processing module 460.

The modulator 474 may modulate the signal obtained from the encoder 472.

The first IC module 470 according to an embodiment of the disclosure may additionally include an MUX in addition to the encoder 472, the modulator 474, and the IC performer 476. The MUX may multiplex the signal obtained from the modulator 474 and channel estimation information obtained from the channel estimating module 462 and transmit a resultant signal to the IC performer 476. The signal multiplexed by the MUX may include information about a channel of a signal before being demodulated by the demodulator 464.

The IC performer 476 may cancel interference of the first wireless communication system signal from the signal obtained from the FFT module 450, based on the signal obtained from the MUX.

The second processing module 480 according to an embodiment of the disclosure may include a channel estimating module 482, a demodulator 484, and a decoder 486.

The channel estimating module 482 may obtain a reference signal among the signals processed by the IC performer 476, and obtain information about channel shift of the signals processed by the IC performer 476, based on the reference signal.

The demodulator 484 may equalize a data signal among the signals processed by the IC performer 476, based on the information about channel shift received from the channel estimating module 482, and demodulate the equalized signal. The demodulator 484 may transmit the demodulated signal to the decoder 486.

The decoder 486 may decode the signal obtained from the demodulator 484. The signal decoded by the decoder 486 may be referred to the signal on which second processing is performed.

FIG. 5 is a flowchart of signal processing processes of an apparatus supporting a plurality of wireless communication system signals according to an embodiment of the disclosure.

In operation 510, the apparatus may receive an integrated signal including a first wireless communication system signal and a second wireless communication system signal, the integrated signal assigned to a certain frequency band.

In operation 520, the apparatus may perform first processing on the integrated signal.

When the apparatus performs IC based on the plurality of wireless communication system signals in a time domain, the first processing may include an operation of performing FFT on the integrated signal, an operation of demodulating the signal on which FFT is performed, and an operation of decoding the demodulated signal.

Also, when the apparatus performs IC based on the plurality of wireless communication system signals in a frequency domain, the first processing may include an operation of demodulating the integrated signal and an operation of decoding the demodulated signal.

In operation 530, the apparatus may perform a second process on the integrated signal.

When the apparatus performs IC based on the plurality of wireless communication system signals in the time domain, the second process may include an operation of performing FFT on the integrated signal, an operation of demodulating the signal on which FFT is performed, and an operation of decoding the demodulated signal.

Also, when the apparatus performs IC based on the plurality of wireless communication system signals in the frequency domain, the second processing may include an operation of demodulating the integrated signal and an operation of decoding the demodulated signal.

In operation 540, the apparatus may be scheduled to perform at least one of first IC of canceling interference of the first wireless communication system signal from the integrated signal based on the signal on which first process is performed or second IC process of canceling interference of the second wireless communication system signal from the integrated signal based on the signal on which second processing is performed.

The first IC process may include an operation of encoding the signal on which first processing is performed, an operation of modulating the encoded signal, an operation of performing IFFT on the modulated signal, and an operation of canceling interference of the first wireless communication system signal from the integrated signal based on the signal on which IFFT is performed. The second IC may include an operation of encoding the signal on which second processing is performed, an operation of modulating the encoded signal, an operation of performing IFFT on the modulated signal, and an operation of canceling interference of the second wireless communication system signal from the integrated signal based on the signal on which IFFT is performed.

When the apparatus e performs IC based on the plurality of wireless communication system signals in the frequency domain, the first IC process may include an operation of canceling interference of the first wireless communication system signal from the integrated signal on which at least one operation among down-sampling, FFT, and resource de-mapping is performed, based on the signal on which IFFT is performed, and the second IC process may include an operation of canceling interference of the second wireless communication system signal from the integrated signal on which at least one operation among down-sampling, FFT, and resource de-mapping is performed, based on the signal on which IFFT is performed.

In operation 550, the apparatus may perform at least one of the first IC or the second IC based on the scheduling.

The apparatus may compare subcarrier spacing of the first wireless communication system signal and subcarrier spacing of the second wireless communication system signal, and may be scheduled to perform at least one of the first IC process or the second IC process in the time domain or frequency domain, based on a result of the comparing. Detail descriptions will be provided below with reference to FIG. 6.

The apparatus may be scheduled to perform both the first IC and the second IC when the first wireless communication system and the second wireless communication system are the same type of wireless communication systems, or are different types of wireless communication systems but similarity of demands for operating each of the first and second wireless communication systems is equal to or greater than a threshold value. Also, the apparatus may be scheduled to perform the first IC process or the second IC process when the first wireless communication system and the second wireless communication system are different types of wireless communication systems while the similarity of demands for operating each of the first and second wireless communication systems is smaller than or equal to or the threshold value. Detail descriptions will be provided below with reference to FIG. 7.

Figure 6:
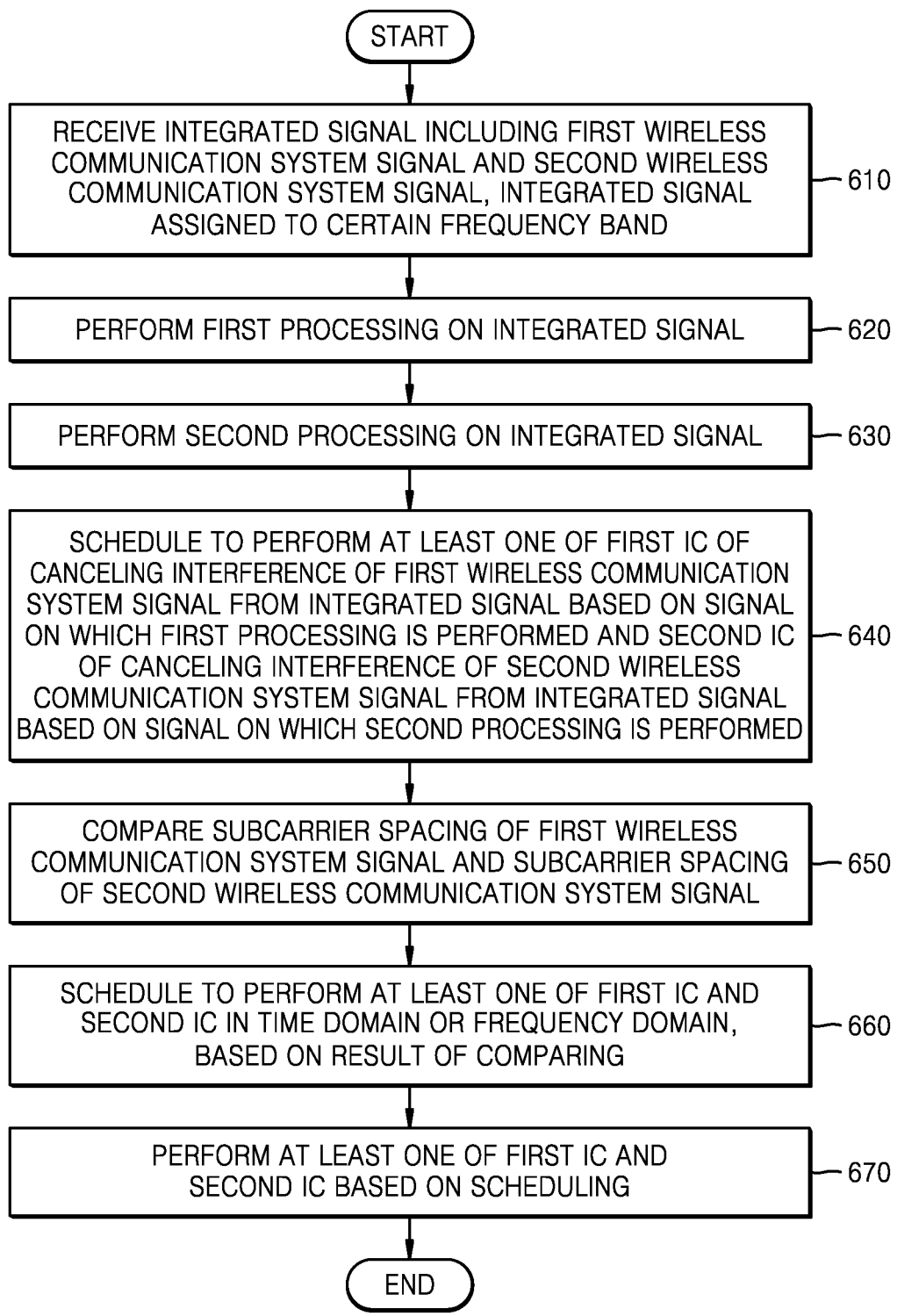
FIG. 6 is another exemplary flowchart of signal processing processes for supporting a plurality of wireless communication system signals according to one embodiment of the disclosure.

FIG. 6 is a flowchart of signal processing processes of an apparatus supporting a plurality of wireless communication system signals, according to another embodiment of the disclosure.

Here, details overlapping the descriptions of FIG. 5 will be briefly provided or omitted. For example, the operations 610 to 640 of FIG. 6 correspond to the operations 510 to 540 of FIG. 5, thus detail descriptions of the operations 610 to 640 are not provided again.

In operation 610, the apparatus may receive an integrated signal including a first wireless communication system signal and a second wireless communication system signal, the integrated signal assigned to a certain frequency band.

In operation 620, the apparatus may perform a first process on the integrated signal.

In operation 630, the apparatus may perform a second process on the integrated signal.

In operation 640, the apparatus may be scheduled to perform at least one of first IC of canceling interference of the first wireless communication system signal from the integrated signal based on the signal on which the first processing is performed or second IC process of canceling interference of the second wireless communication system signal from the integrated signal based on the signal on which the second processing is performed.

In operation 650, the apparatus may compare subcarrier spacing of the first wireless communication system signal and subcarrier spacing of the second wireless communication system signal. Also, the apparatus may compare a sampling rate of the first wireless communication system signal with a sampling rate of the second wireless communication system signal.

The apparatus may determine whether the subcarrier spacing of the first wireless communication system signal and the subcarrier spacing of the second wireless communication system signal are the same or whether a similarity thereof are equal to or greater than a threshold value.

In operation 660, the apparatus may be scheduled to perform at least one of the first IC process or the second IC process in the time domain or the frequency domain, based on a result of the comparison.

When it is determined that the subcarrier spacings of the first and second wireless communication system signals are the same or the similarity thereof is equal to or greater than the threshold value in operation 650, the apparatus may be scheduled to perform at least one of the first IC process or the second IC process in the time domain. In other words, the apparatus may be scheduled to perform an IC process of a signal in the time domain before FFT is performed on the signal.

Also, when it is determined that the subcarrier spacings of the first and second wireless communication system signals are different or the similarity thereof is smaller than the threshold value in operation 650, the apparatus may be scheduled to perform at least one of the first IC or the second IC in the frequency domain. In other words, the apparatus may be scheduled to perform IC of a signal in the frequency domain after FFT is performed on the signal.

In operation 670, the apparatus may perform at least one of the first IC or the second IC based on the scheduling.

The apparatus according to an embodiment of the disclosure may perform at least one of the first IC or the second IC in the time domain or the frequency domain according to the scheduling in operations 640 and 660.

Figure 7:
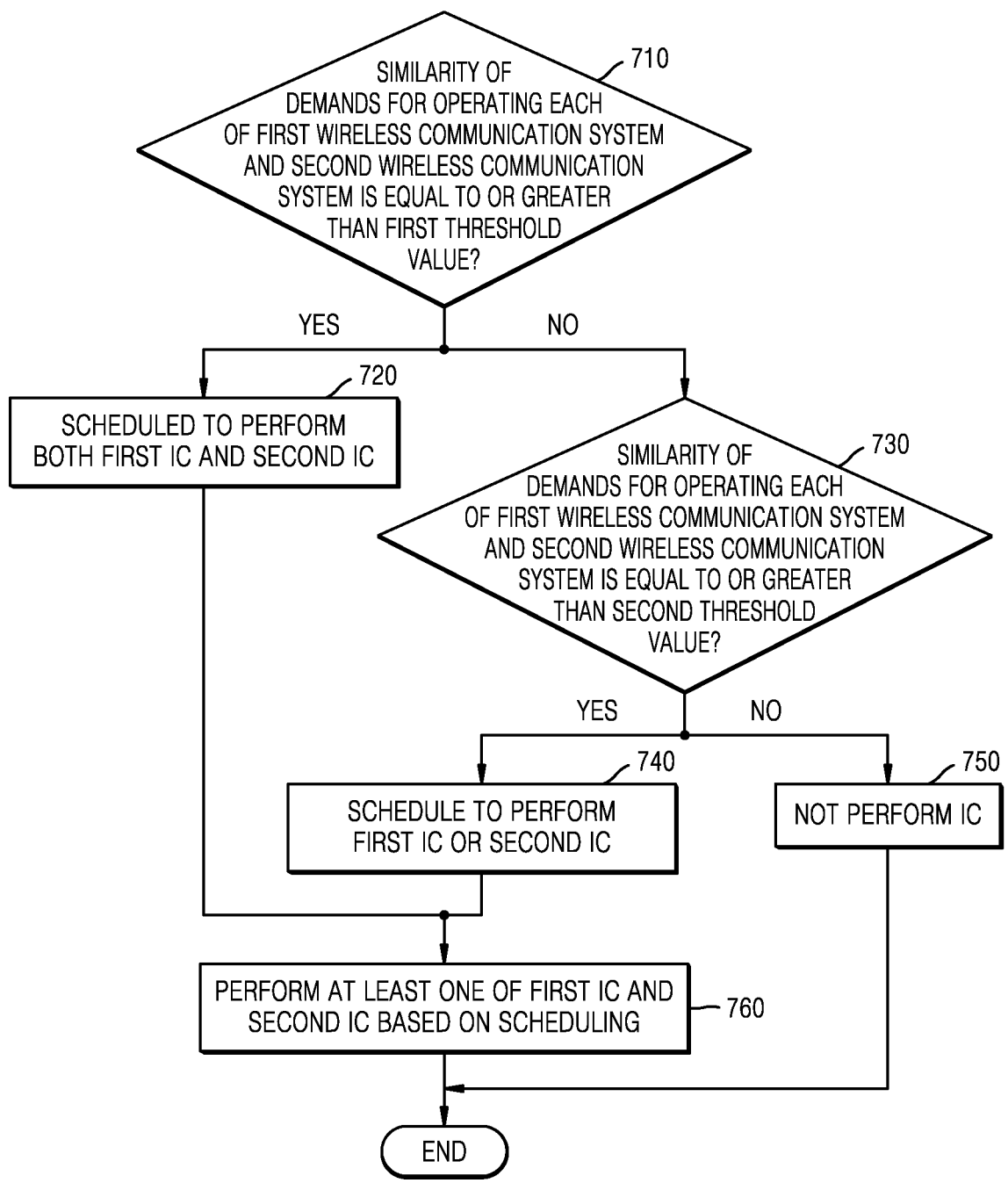
FIG. 7 is another exemplary flowchart of signal processing processes for supporting on a plurality of wireless communication system signals according to one embodiment of the disclosure.

FIG. 7 is a flowchart of signal processing processes of an apparatus supporting a plurality of wireless communication system signals according to another embodiment of the disclosure.

Here, detail descriptions overlapping the descriptions of FIG. 5 will be briefly described or omitted.

In the present specification, a "wireless communication system" may be concept classified based on a communication generation (for example, 3G, LTE, and NR of 3GPP are different in communication generations), a communication standard (WiMAX and WiFi of IEEE are different in communication standards), etc.

Also, in the present specification, "feature" may denote a standardized method for different services in the same type of wireless communication systems. For example, NB-IoT and eMTC belong to the same type of wireless communication systems of LTE, but may correspond to different types of features. The different types of features may differ in subcarrier spacing, slot spacing, and the like.

It would be easily understood by one of ordinary skill in the art that operation 710 of FIG. 7 will be performed after operation 530 of FIG. 5 is performed.

In operation 710, the apparatus may determine whether the similarity of demands for operating each of the first and second wireless communication systems is equal to or greater than a first threshold value.

For example, the apparatus may determine that the first and second wireless communication systems are the same type of wireless communication systems when both are LTE, NR, IoT, mMTC, eMTC, WiMAX, 3G, or V2X. When the first and second wireless communication systems are determined to be the same type of wireless communication systems, the apparatus may determine that the similarity of demands for operating each of the first and second wireless communication systems is equal to or greater than the first threshold value.

Alternatively, when the first wireless communication system is LTE and the second wireless communication system is NR or when the first wireless communication system is NR and the second wireless communication system is LTE, the apparatus may determine that the similarity of demands for operating each of the first and second wireless communication systems is equal to or greater than the first threshold value. However, an example of the apparatus determining that the similarity of demands for operating each of the first and second wireless communication systems is equal to or greater than the first threshold value is not limited thereto.

When it is determined that the similarity of demands for operating each of the first and second wireless communication systems is equal to or greater than the first threshold value, the apparatus may be scheduled to perform both the first IC and the second IC in operation 770.

In other words, when it is determined that the similarity of demands for operating each of the first and second wireless communication systems is equal to or greater than the first threshold value, the apparatus may perform bi-directional IC processes as described in FIGS. 3A and 4A.

In operation 730, the apparatus may determine whether the similarity of demands for operating each of the first and second wireless communication systems is equal to or greater than a second threshold value. When it is determined that the similarity of demands for operating each of the first and second wireless communication systems is equal to or greater than the second threshold value, the apparatus may be scheduled to perform first IC process or second IC process in operation 740. The second threshold value may be smaller than the first threshold value.

In other words, when it is determined that the similarity of demands for operating each of the first wireless communication system and the second wireless communication system is smaller than the first threshold value while equal to or greater than the second threshold value, the apparatus may perform uni-directional IC processes as described in FIGS. 3B and 4B.

When it is determined that the similarity of demands for operating each of the first wireless communication system and the second wireless communication system is smaller than the second threshold value, the apparatus may not perform an IC process in operation 750.

In operation 760, the apparatus may perform at least one of the first IC process or the second IC process based on the scheduling.

The apparatus according to an embodiment of the disclosure may perform the bi-directional IC of performing both the first IC process or the second IC process or perform the a uni-directional IC process of performing the first IC process or the second IC process based on the scheduling in operations 540 and 720 or the scheduling in operations 540 and 740.

Figure 8:
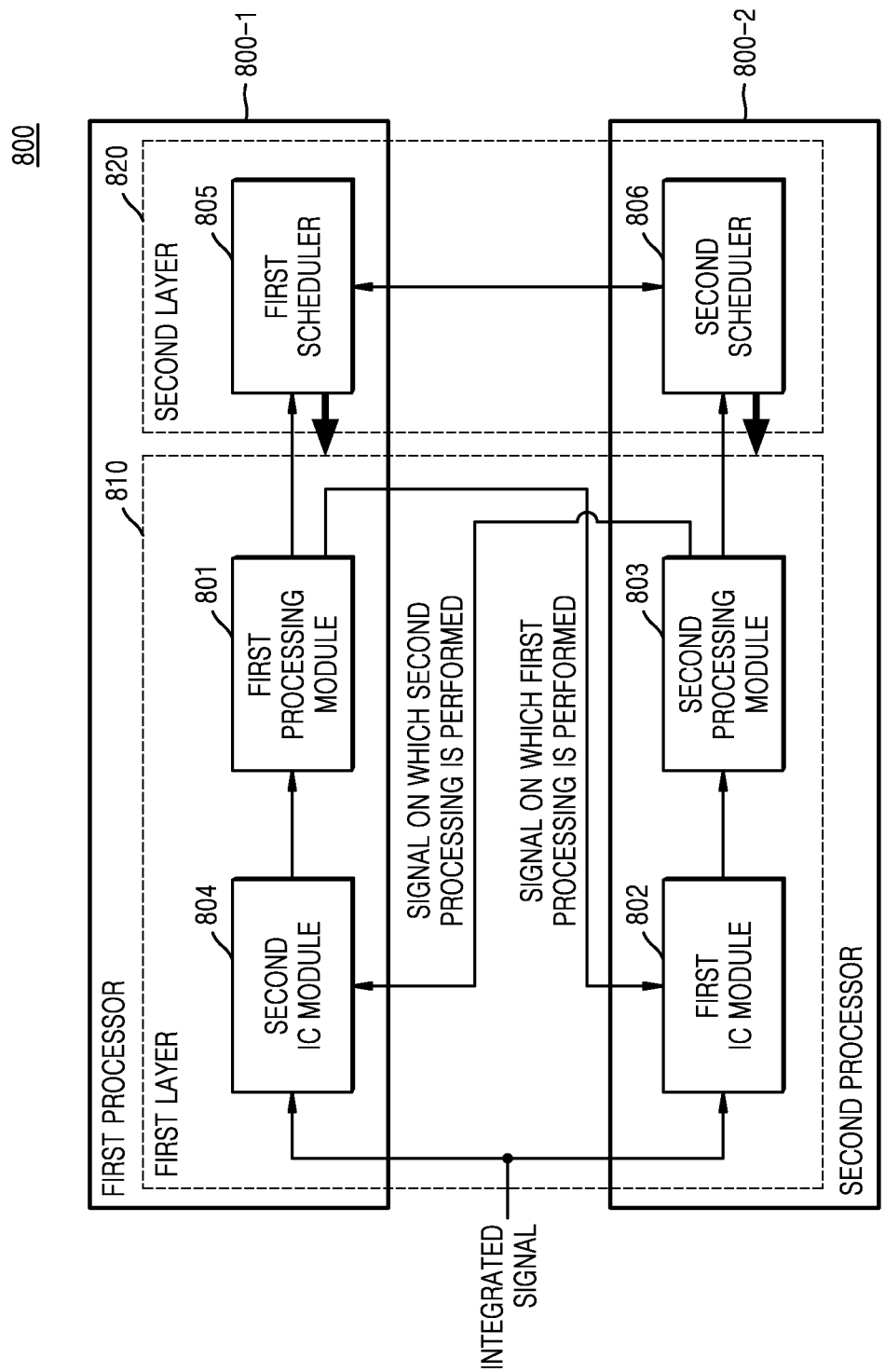
FIG. 8 is another exemplary diagram showing signal processing processes for supporting a plurality of wireless communication system signals in consideration of a layer according to one embodiment of the disclosure.

FIG. 8 is a diagram showing processes of an apparatus 800 supporting a plurality of wireless communication system signals in consideration of a layer according to an embodiment of the disclosure.

Here, detail descriptions overlapping the descriptions of FIGS. 3A through 7 will be omitted or briefly provided.

The first processing module 801 operates in the same or similar manner as the first processing module 310 of FIG. 3A, the first processing module 350 of FIG. 3B, the first processing module 410 of FIG. 4A, and the first processing module 460 of FIG. 4B. First IC module 802 operates in the same or similar manner as the first IC module 320 of FIG. 3A, the first IC module 360 of FIG. 3B, the first IC module 420 of FIG. 4A, and the first IC module 470 of FIG. 4B. Second processing module 803 operates in the same or similar manner as the second processing module 330 of FIG. 3A, the second processing module 370 of FIG. 3B, the second processing module 430 of FIG. 4A, and the second processing module 480 of FIG. 4B. Second IC module 804 operates in the same or similar manner as the second IC module 340 of FIG. 3A and the second IC module 440 of FIG. 4A.

The apparatus 800 according to an embodiment of the disclosure may include a first processor 800-1 and a second processor 800-2.

The first processor 800-1 may include the first processing module 801, the second IC module 804, and a first scheduler 805.

The second processor 800-2 may include the second processing module 803, the first IC module 802, and a second scheduler 806.

In the present specification, a "first layer 810" may denote a layer including a physical (PHY) layer. Also, a "second layer 820" may denote a layer including a medium access control (MAC) layer, a packet data convergence protocol (PDCP) layer, and a radio link control (RLC) layer. The second layer 820 may be an upper layer of the first layer 810.

The first processor 800-1 may perform the first processing and the second IC in the first layer 810. For example, the first processing module 801 and the second IC module 804 included in the first processor 800-1 may respectively perform the first processing and the second IC in the first layer 810. The first processing module 801 that performed the first processing in the first layer 810 may transmit information about the first processing to the first scheduler 805 of the second layer 820.

The second processor 800-2 may perform the second processing and the first IC in the first layer 810. For example, the second processing module 803 and the first IC module 802 included in the second processor 800-2 may respectively perform the second processing and the first IC in the first layer 810. The second processing module 803 that performed the second processing in the first layer 810 may transmit information about the second processing to the second scheduler 806 of the second layer 820.

The first scheduler 805 may transmit the information about the first processing from the second layer 820 that is the upper layer of the first layer 810 to the second scheduler 806 included in the second processor 800-2, and receive the information about the second processing from the second scheduler 806. The first scheduler 805 may schedule whether the second IC module 804 performs the second IC in the first layer 810, based on the information about the first processing and the second processing.

The second scheduler 806 may transmit the information about the second processing from the second layer 820 that is the upper layer of the first layer 810 to the first scheduler 805 included in the first processor 800-1, and receive the information about the first processing from the first scheduler 805. The second scheduler 806 may schedule whether the first IC module 802 performs the first IC in the first layer 810, based on the information about the first processing and the second processing.

Figure 9:
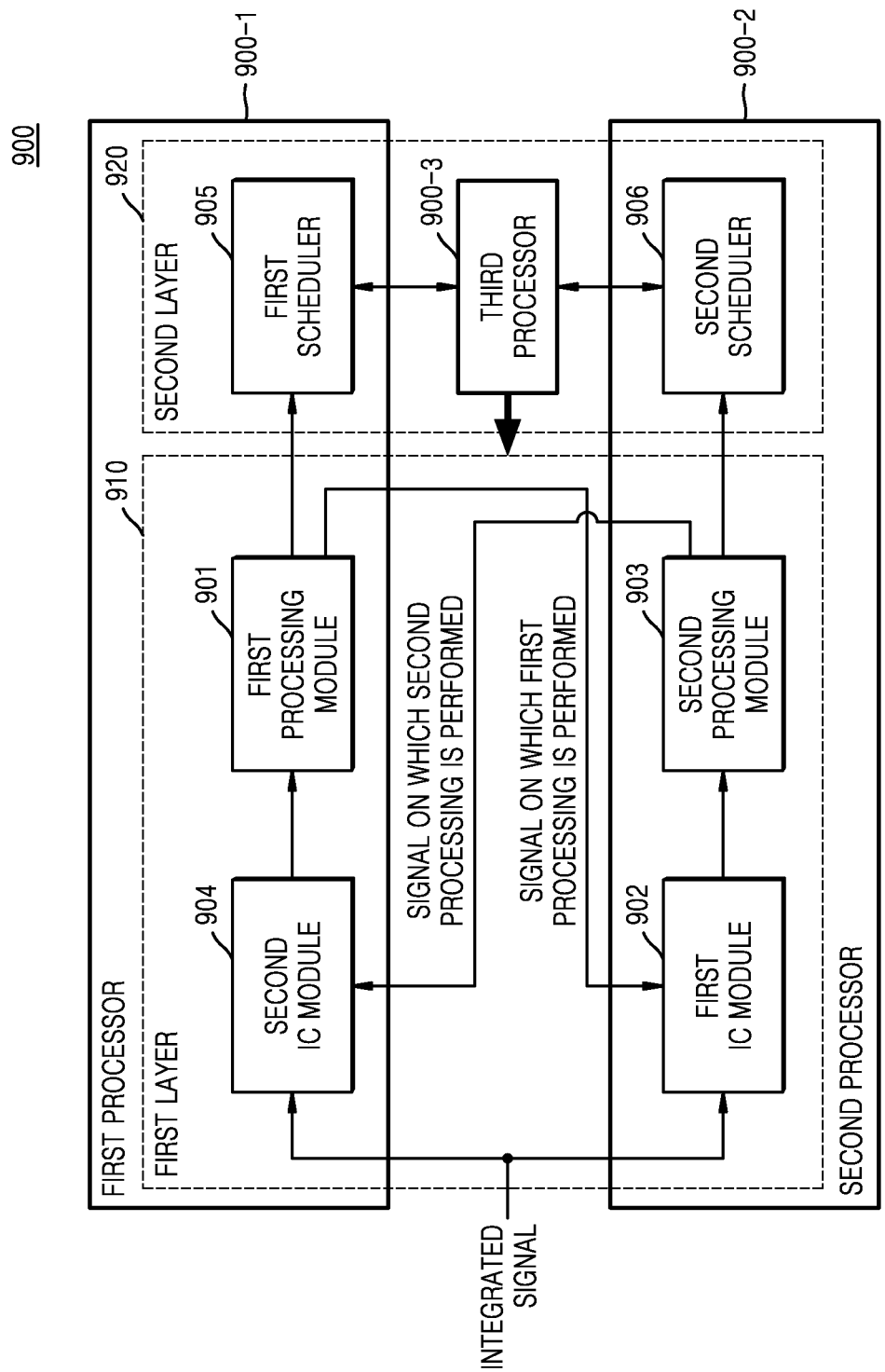
FIG. 9 is another exemplary diagram showing signal processing processes for supporting a plurality of wireless communication system signals in consideration of a layer according to one embodiment of the disclosure.

FIG. 9 is a diagram showing processes of an apparatus 900, according to another embodiment of the disclosure, supporting a plurality of wireless communication system signals in consideration of a layer.

Here, detail descriptions overlapping the descriptions of FIGS. 3A through 8 will be omitted or briefly described.

The apparatus 900 according to an embodiment of the disclosure may include a first processor 900-1, a second processor 900-2, and a third processor 900-3.

The third processor 900-3 may schedule overall operations of the apparatus 900. For example, the third processor 900-3 may integrally schedule overall operations of the first processor 900-1 and the second processor 900-2 of the apparatus 900.

The third processor 900-3 may obtain the information about first processing from the first processor 900-1. Also, the third processor 900-3 may obtain the information about second processing from the second processor 900-2. For example, the third processor 9003 may obtain the information about first processing from the first processor 900-1 and the information about second processing from the second processor 900-2, in a second layer 920.

The third processor 900-3 may control operations of the first processor 900-1 and second processor 900-2 performed in a first layer 910, based on the information about first processing and second processing. For example, the third processor 900-3 may schedule at least one of the second IC by the first processor 900-1 or the first IC by the second processor 900-2 to be performed in the first layer 910, based on the information about first processing and second processing.

Figure 10:
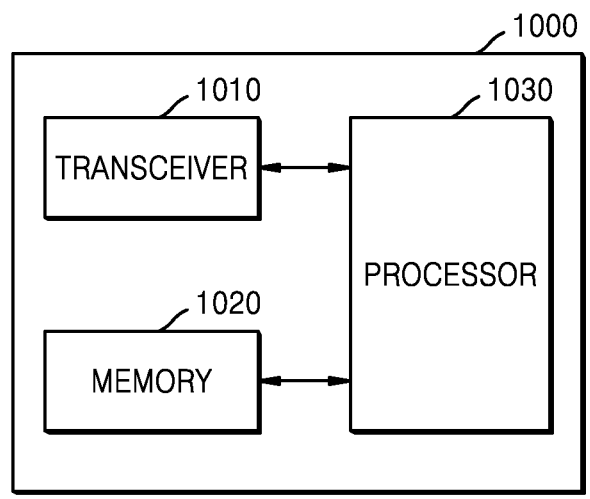
FIG. 10 is an exemplary block diagram of a configuration of an apparatus, according to one embodiment of the disclosure.

FIG. 10 is a block diagram of a configuration of an apparatus 1000, according to an embodiment of the disclosure.

Components of the apparatus 1000 of FIG. 1 may perform operations described with reference to FIGS. 1 through 9, and detail descriptions overlapping the descriptions of FIGS. 1 through 9 will be omitted or briefly provided.

As shown in FIG. 10, the apparatus 1000 may include a transceiver 1010, a memory 1020, and a processor 1030. However, the components shown in FIG. 10 are not all essential components of the apparatus 1000, and the apparatus 1000 may include more or less components than those shown in FIG. 10. Moreover, in the apparatus 1000 according to an embodiment of the disclosure, the transceiver 1010, the memory 1020, and the processor 1030 may be embodied in one chip.

The transceiver 1010 may transmit and receive a signal to and from a terminal. The signal may include control information or data. The transceiver 1010 according to an embodiment of the disclosure may include a radio frequency (RF) unit, and the RF unit may include an RF transmitter and an RF receiver.

The transceiver 1010 may receive an integrated signal including a plurality of wireless communication system signals assigned to a certain frequency band. For example, the transceiver 1010 may receive an integrated signal including a first wireless communication system signal and second wireless communication system signal, the integrated signal assigned to a certain frequency band.

The processor 1030 may control overall operations of the apparatus 1000. For example, the processor 1030 may perform functions or operations of the apparatus 1000 described with reference to FIGS. 1 through 9. Also, the processor 1030 may control the components included in the apparatus 1000, such as the transceiver 1010, the memory 1020, etc., in overall.

The processor 1030 may perform a first process on the integrated signal.

Also, the processor 1030 may perform a second process on the integrated signal.

Also, the processor 1030 may perform scheduling such that at least one of first IC process of canceling interference of a first wireless communication system signal from the integrated signal based on the signal on which the first processing is performed or second IC process of canceling interference of a second wireless communication system signal from the integrated signal based on the signal on which the second processing is performed is performed.

Also, the processor 1030 may perform at least one of the first IC process or the second IC based on the scheduling.

The memory 1020 may store at least one program for processes and controls of the processor 1030, and may store a signal input to or output from the apparatus 1000.

The processor 1030 may support the plurality of wireless communication systems by executing the at least one program stored in the memory 1020.

Figure 11:
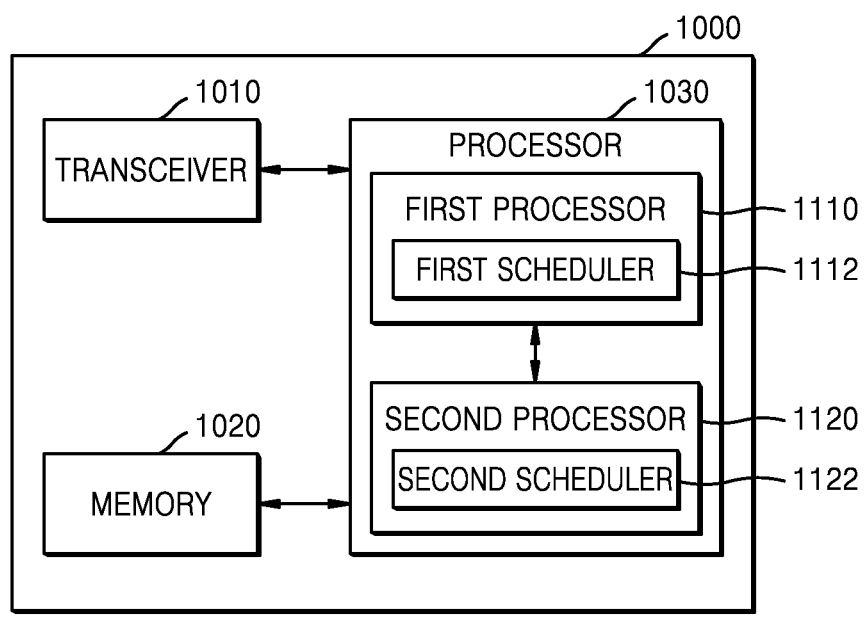
FIG. 11 is an exemplary block diagram of a configuration of an apparatus, according to another embodiment of the disclosure.

FIG. 11 is a block diagram of a configuration of the apparatus 1000, according to another embodiment of the disclosure.

Here, detail descriptions overlapping the descriptions of FIGS. 8 and 10 will be omitted or briefly provided.

As shown in FIG. 11, the processor 1030 included in the apparatus 1000 according to an embodiment of the disclosure may include a first processor 1110 and a second processor 1120. However, components included in the processor 1030 of FIG. 11 are not all essential components of the processor 1030. The processor 1030 of FIG. 11 may include more or less components than those shown in FIG. 11. Also, a first scheduler 1112 included in the first processor 1110 and a second scheduler 1122 included in the second processor 1120 of FIG. 11 are not each an essential component of the first and second processors 1110 and 1120.

The apparatus 1000 in FIG. 11 may operate in the same or similar manner as the apparatus 800 in FIG. 8.

According to an embodiment of the disclosure, the first scheduler 1112 included in the first processor 1110 may exchange information with the second scheduler 1122 included in the second processor 1120 such that the first processor 1110 may perform scheduling to perform at least one of the first process or the second IC process described above.

Also, the second scheduler 1122 included in the second processor 1120 may exchange information with the first scheduler 1112 included in the first processor 1110 such that the second processor 1120 may perform a scheduling to perform t least one of the second processing or the first IC described above.

Figure 12:
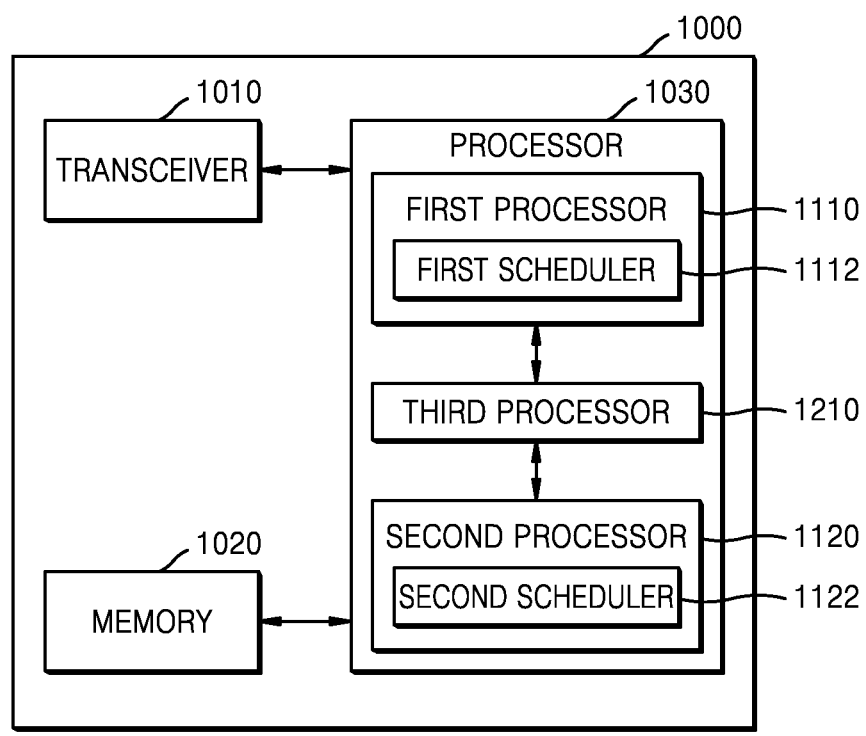
FIG. 12 is an exemplary block diagram of a configuration of an apparatus, according to another embodiment of the disclosure.

FIG. 12 is a block diagram of a configuration of the apparatus 1000, according to another embodiment of the disclosure.

Here, the details overlapping the descriptions of FIGS. 9 and 10 will be omitted or briefly described.

As shown in FIG. 12, the apparatus 1000 may include a third processor 1210 in addition to the first processor 1110 and the second processor 1120. In the processor 1030 according to an embodiment of the disclosure, the first processor 1110, the second processor 1120, and the third processor 1210 may be embodied in one chip.

The apparatus 1000 in FIG. 12 may operate in the same or similar manner as the apparatus 900 in FIG. 9.

The third processor 1210 may obtain the information about first processing from the first scheduler 1112 included in the first processor 1110, and obtain the information about second processing from the second scheduler 1122 included in the second processor 1120.

The third processor 1210 may schedule overall operations of the first processor 1110 and the second processor 1120, based on the information about first processing and second processing. For example, the third processor 1210 may schedule whether the first processor 1110 is to perform the second IC process and whether the second processor 1120 is to perform the first IC process, based on the information about first processing and second processing.

For example, the third processor 1210 may schedule at least one of the second IC by the first processor 1110 or the first IC process by the second processor 1120 to be performed, based on the information about first process and second process.

It should be understood that embodiments of the disclosure described herein should be considered in a descriptive sense only and not for purposes of limitation. Descriptions of features or aspects within each embodiment of the disclosure should typically be considered as available for other similar features or aspects in other embodiments of the disclosure.

While one or more embodiments of the disclosure have been described with reference to the figures, it will be understood by those of ordinary skill in the art that various changes in form and details may be made therein without departing from the spirit and scope as defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An apparatus for supporting a plurality of wireless communication systems, the apparatus comprising:
   a memory;
   a transceiver configured to receive an integrated signal comprising a first wireless communication system signal and a second wireless communication system signal assigned to a certain frequency band; and
   at least one processor configured to:
      perform a first process on the integrated signal and perform a second process on the integrated signal,
      schedule the apparatus to perform at least one of a first interference cancellation (IC) process of canceling interference of the first wireless communication system signal from the integrated signal based on the signal on which first processing is performed or a second IC process of canceling interference of the second wireless communication system signal from the integrated signal based on the signal on which second processing is performed, and
      perform at least one of the first IC process or the second IC process based on the schedule.

2. The apparatus of claim 1, wherein the at least one processor is further configured to:
   compare a subcarrier spacing of the first wireless communication system signal with a subcarrier spacing of the second wireless communication system signal, and
   schedule the apparatus to perform at least one of the first IC process or the second IC process in a time domain or a frequency domain, based on a result of the comparison.

3. The apparatus of claim 1, wherein the first process comprises an operation of performing first demodulation on the integrated signal on which Fast Fourier Transform (FFT) is performed and an operation of performing first decoding on the integrated signal on which the first demodulation is performed,
   the second process comprises an operation of performing second demodulation on the integrated signal on which FFT is performed and an operation of performing second decoding on the integrated signal on which the second demodulation is performed,
   the first IC process comprises:
      an operation of performing a first encoding on the integrated signal on which the first decoding is performed;
      an operation of performing a first modulation on the integrated signal on which the first encoding is performed; and
      an operation of canceling interference of the first wireless communication system signal from the integrated signal on which the FFT is performed, based on the integrated signal on which the first modulation is performed; and
   the second IC process comprises:
      an operation of performing a second encoding on the integrated signal on which the second decoding is performed;
      an operation of performing a second modulation on the integrated signal on which the second encoding is performed; and
      an operation of canceling interference of the second wireless communication system signal from the integrated signal on which the FFT is performed, based on the integrated signal on which the second modulation is performed.

4. The apparatus of claim 1, wherein:
   the first process comprises:
      an operation of performing FFY on the integrated signal,
      an operation of performing a third demodulation on the integrated signal on which FFT is performed, and
      an operation of performing a third decoding on the integrated signal on which the third demodulation is performed;
   the second process comprises:
      an operation of performing FFT on the integrated signal;
      an operation of performing a fourth demodulation on the integrated signal on which FFT is performed, and
      an operation of performing a fourth decoding on the integrated signal on which the fourth demodulation is performed;
   the first IC process comprises:
      an operation of performing a third encoding on the integrated signal on which the third decoding is performed;
      an operation of performing a third modulation on the integrated signal on the third encoding is performed; and
      an operation of canceling interference of the first wireless communication system signal from the integrated signal, based on the integrated signal on which the third modulation is performed; and
   the second IC process comprises:
      an operation of performing fourth encoding on the integrated signal on which the fourth decoding is performed;
      an operation of performing fourth modulation on the integrated signal on which the fourth encoding is performed; and
      an operation of canceling interference of the second wireless communication system signal from the integrated signal, based on the integrated signal on which the fourth modulation is performed.

5. The apparatus of claim 1, wherein the at least one processor is further configured to schedule the apparatus to perform both the first IC process and the second IC process when a similarity of demands for operating each of a first wireless communication system and a second wireless communication system is equal to or greater than a pre-set first threshold value,
   wherein a feature denotes a standardized method for different services in a same type of wireless communication systems.

6. The apparatus of claim 1, wherein the at least one processor is further configured to schedule the apparatus to perform the first IC process or the second IC process when similarity of demands for operating each of a first wireless communication system and a second wireless communication system is smaller than a pre-set first threshold value and is equal to or greater than a pre-set second threshold value, wherein a feature denotes a standardized method for different services in a same type of wireless communication systems.

7. The apparatus of claim 1, wherein a first wireless communication system and a second wireless communication system are different types of wireless communication systems having different communication standards, or the first wireless communication system and the second wireless communication system are a same type of wireless communication systems and are different types of features standardized for different services.

8. The apparatus of claim 1, wherein the at least one processor comprises:

a first processor configured to perform the first process on the integrated signal and perform the second IC process;

a second processor configured to perform the second process on the integrated signal and perform the first IC process; and a third processor configured to:
obtain information about the first processing from the first processor;
obtain information about the second processing from the second processor; and
schedule the apparatus to perform at least one of the second IC process by the first processor or the first IC process by the second processor, based on the information about the first processing and the information about the second processing.

9. The apparatus of claim 8, wherein:
the first processor is further configured to:
perform the first processing and the second IC process on a first layer; and
transmit the information about the first processing to the third processor from a second layer that is an upper layer of the first layer, and
the second processor is further configured to:
perform the second processing and the first IC process on the first layer; and
transmit the information about the second processing to the third processor from the second layer.

10. The apparatus of claim 1, wherein the at least one processor comprises:
a first processor configured to:
perform the first processing on the integrated signal;
schedule whether to perform the first IC based on information about the first processing; and
perform the first IC process based on the schedule whether to perform the first IC process; and
a second processor configured to:
perform the second processing on the integrated signal;
schedule whether to perform the second IC based on the information about the second processing; and
perform the second IC based on the schedule whether to perform the second IC.

11. The apparatus of claim 10, wherein the first processor is further configured to:
perform the first processing on a first layer;
transmit the information about the first processing to the second processor from a second layer that is an upper layer of the first layer;
receive the information about the second processing from the second processor; and schedule whether to perform the second IC process on the first layer based on the information about the first processing and the information about the second processing.

12. The apparatus of claim 10, wherein the second processor is further configured to:
perform the second processing on a first layer, transmit the information about the second processing to the first processor from a second layer that is an upper layer of the first layer;
receive the information about the first processing from the first processor; and
schedule whether to perform the first IC process on the first layer based on the information about the first process and the information about the second process.

13. An operating method for an apparatus capable of supporting a plurality of wireless communication systems, the operating method comprising:
receiving an integrated signal comprising a first wireless communication system signal and a second wireless communication system signal assigned to a certain frequency band;
performing a first process on the integrated signal;
performing a second process on the integrated signal;
scheduling apparatus to perform at least one of first interference cancellation (IC) process of canceling interference of the first wireless communication system signal from the integrated signal based on the signal on which first process is performed or second IC process of canceling interference for the second wireless communication system signal from the integrated signal based on the signal on which second processing is performed; and
performing at least one of the first IC process or the second IC process based on the scheduling.

14. The operating method of claim 13, further comprising:
comparing a subcarrier spacing of the first wireless communication system signal with a subcarrier spacing of the second wireless communication system signal; and
scheduling the apparatus to perform at least one of the first IC process or the second IC process in a time domain or a frequency domain, based on a result of the comparison.

15. The operating method of claim 13, wherein:
the first process comprises an operation of performing a first demodulation on the integrated signal on which Fast Fourier Transform (FFT) is performed, and an operation of performing a first decoding on the integrated signal on which the first demodulation is performed,
the second process comprises an operation of performing a second demodulation on the integrated signal on which FFT is performed, and an operation of performing a second decoding on the integrated signal on which the second demodulation is performed, the first IC comprises an operation of performing a first encoding on the integrated signal on which the first decoding is performed; an operation of performing a first modulation on the integrated signal on which the first encoding is performed, and an operation of canceling interference of the first wireless communication system signal from the integrated signal on which the FFT is performed, based on the integrated signal on which the first modulation is performed, and
the second IC comprises an operation of performing a second encoding on the integrated signal on which the second decoding is performed, an operation of performing a second modulation on the integrated signal on which the second encoding is performed, and an operation of canceling interference of the second wireless communication system signal from the integrated signal on which the FFT is performed, based on the integrated signal on which the second modulation is performed.

16. The operating method of claim 13, wherein:
the first processing comprises an operation of performing FFT on the integrated signal, an operation of performing a third demodulation on the integrated signal on which FFT is performed, and an operation of performing a third decoding on the integrated signal on which the third demodulation is performed,
the second processing comprises an operation of performing FFT on the integrated signal, an operation of performing a fourth demodulation on the integrated signal on which FFT is performed, and an operation of performing a fourth decoding on the integrated signal on which the fourth demodulation is performed,
the first IC process comprises an operation of performing a third encoding on the integrated signal on which the third decoding is performed, an operation of performing a third modulation on the integrated signal on the third encoding is performed, and an operation of canceling interference of the first wireless communication system signal from the integrated signal, based on the integrated signal on which the third modulation is performed, and
the second IC process comprises an operation of performing a fourth encoding on the integrated signal on which the fourth decoding is performed, an operation of performing a fourth modulation on the integrated signal on which the fourth encoding is performed, and an operation of canceling interference of the second wireless communication system signal from the integrated signal, based on the integrated signal on which the fourth modulation is performed.

17. The operating method of claim 13, wherein the scheduling comprises scheduling the apparatus to perform both the first IC process and the second IC process when a similarity of demands for operating each of a first wireless communication system and a second wireless communication system is equal to or greater than a pre-set first threshold value.

18. The operating method of claim 13, wherein the scheduling comprises scheduling the apparatus to perform the first IC process or the second IC process when a similarity of demands for operating each of a first wireless communication system and a second wireless communication system is smaller than a pre-set first threshold value and is equal to or greater than a pre-set second threshold value.

19. The operating method of claim 13, wherein the first processing, the second processing, the first IC, and the second IC are performed in a first layer, and
the scheduling comprises scheduling the apparatus to perform at least one of the first IC process or the second IC process on a second layer that is an upper layer of the first layer.

20. A non-transitory computer-readable recording medium having recorded thereon a program which, when executed by a computer, cause a processor of an apparatus to:
receive an integrated signal comprising a first wireless communication system signal and a second wireless communication system signal assigned to a certain frequency band;
perform a first process on the integrated signal;
perform a second process on the integrated signal;
schedule the apparatus to perform at least one of first interference cancellation (IC) process of canceling interference of the first wireless communication system signal from the integrated signal based on the signal on which first process is performed or second IC process of canceling interference for the second wireless communication system signal from the integrated signal based on the signal on which second processing is performed; and
perform at least one of the first IC process or the second IC process based on the scheduling.

* * * * *